United States Patent
Lowe, Sr. et al.

(10) Patent No.: US 6,643,935 B1
(45) Date of Patent: Nov. 11, 2003

(54) COMBINED SHEARS AND LOPPERS

(76) Inventors: Joseph T. Lowe, Sr., 2324 Raintree Dr., Brea, CA (US) 92821; Richard G. Lowe, 3909 Springcress Dr., Columbia, MO (US) 65202

( * ) Notice: Subject to any disclaimer, the term of this patent is extended or adjusted under 35 U.S.C. 154(b) by 0 days.

(21) Appl. No.: 10/142,552

(22) Filed: May 8, 2002

Related U.S. Application Data (63) Continuation-in-part of application No. 09/924,345, filed on Aug. 9, 2001.

(51) Int. Cl.$^7$ .............................................. B26B 13/00
(52) U.S. Cl. .............................. 30/142; 30/196; 30/252; 30/270; 30/369
(58) Field of Search ........................ 30/142, 146, 369, 30/199, 201, 234, 235, 244, 196, 252, 125, 211, 250, 270, 340, 341; 81/9.43, 68, 90.1, 90.2, 111, 176

(56) References Cited

U.S. PATENT DOCUMENTS

| | | | | |
|---|---|---|---|---|
| 1,299,100 A | * | 4/1919 | Anderson | 30/227 |
| 1,507,529 A | * | 9/1924 | Sundman | 30/227 |
| 5,419,045 A | * | 5/1995 | Magdich | 30/145 |
| 5,466,241 A | * | 11/1995 | Leroy et al. | 606/139 |
| 5,697,157 A | * | 12/1997 | Votolato | 30/2 |
| 5,966,816 A | * | 10/1999 | Roberson | 30/156 |
| 6,334,255 B1 | * | 1/2002 | Chang | 30/252 |
| 2002/0124414 A1 | * | 9/2002 | Yang | 30/254 |

* cited by examiner

*Primary Examiner*—Allan N. Shoap
*Assistant Examiner*—Phong Nguyen
(74) *Attorney, Agent, or Firm*—Jack C. Munro (57) ABSTRACT

A cutting tool which has a first cutting blade which is mounted in a scissors arrangement with a second cutting blade. The first cutting blade has formed at one end thereof a first cutting element and at the opposite end thereof a second cutting element. The second cutting blade has formed thereon a third cutting element at one end thereof and at the opposite end thereof a fourth cutting element. The cutting blades are pivotally connected intermediate their ends by the inner end by a pair of handle members with the cutting blades being captured between the handle members. The handle members are to be pivotable between a first position and a second position. When in the first position, the first cutting element and third cutting element are extended and capable of performing a cutting operation on an exterior structure. Flipping of the handle members to the second position causes the second cutting element and fourth cutting element to be extended capable of performing a cutting operation on an exterior structure.

20 Claims, 5 Drawing Sheets

COMBINED SHEARS AND LOPPERS

REFERENCE TO PRIOR APPLICATION

This application is a continuation-in-part of U.S. patent application Ser. No. 09/924,345, filed Aug. 9, 2001, COMBINED SHEARS AND LOPPERS, by the present inventors.

BACKGROUND OF THE INVENTION

1. Field of the Invention

The present invention is directed to cutting tools and more particularly to cutting tools that are designed to be utilized in the performing of a certain type of task.

2. Description of the Related Art

There are many different types of cutting tools. Generally, cutting tools are designed in conjunction with a particular task. For example, different types of garden tools include both shears and loppers. A loppers is defined as a long handled pruning shear with the cutting elements actually comprising a single cutting member which is moved in contact with and alongside a curved member. Loppers are frequently used to easily cut twigs and branches of trees and bushes up from one-quarter to one inch in diameter. Shears comprise two blade members each of which have a cutting element that cooperate together to perform a cutting operation and where the cutting elements are movable relative to each other in a scissors configuration when performing of the cutting operation. Each blade member of the shears is essentially identical in shape. Shears are commonly used to accomplish trimming of bushes and trees where the user is cutting only very small diameter twigs and vegetation. Shears do not operate effectively when trying to cut a branch of one quarter of an inch in diameter and larger.

In the past, a user, when performing of gardening tasks, will have purchased both a shears and a loppers with the user switching between the two tools according to the specific task that is being performed. It would be desirable to include within a single tool a shears and loppers.

Although the subject matter of this invention is being discussed in relation to a garden type tool, such as a shears and loppers, it is considered to be within the scope of this invention that the cutting tool could be utilized in conjunction with other types of cutting elements other than shears and loppers. Also, it is considered to be within the scope of this invention that the cutting tool could be used in fields other than to perform gardening operations.

SUMMARY OF THE INVENTION

The primary objective of the present invention is to construct a cutting tool which includes multiple cutting element such as a shears and loppers.

A first basic embodiment of the present invention comprises a pair of cutting blades with a pair of handle members being connected to the cutting blades with the handle members being movable each about one hundred forty degrees between a first position and a second position. When in the first position, a first set of cutting blades is to be capable of performing a cutting operation. When in the second position, a second set of cutting blades is to be capable of performing a second cutting operation.

A further embodiment of this invention is where the cutting blades of the first basic embodiment are pivotally mounted relative to each other.

A further embodiment of this invention is where the first basic embodiment includes a lock to lock the handle members of the tool in both the first position and the second position.

A further embodiment of this invention is where each lock is actuated by an actuator located at the outer free end of each handle member.

A further embodiment of this invention is where a connection between the lock and the actuators at the outer free end of the handle members takes the form of a cable mounted in conjunction with each handle member with there being a separate cable for each handle member.

A further embodiment of this invention is where the lock comprises a spring biased locking pin mounted in conjunction with each handle member with there being a separate spring biased locking pin for each handle member.

A further embodiment of this invention is where the actuator comprises a pivotally mounted lever with this lever being attached to a cable.

A further embodiment of this invention is where the lever is defined as having a bulbous free end with this bulbous free end functioning as an actuator facilitating manual pivoting of the lever and also as a stop to keep the user's hands properly located on the handle members.

A further embodiment of this invention is where the spring biased locking pin is defined as being confined within a spring housing with the locking pin being lineally movable between a locked position and an unlocked position.

A second basic embodiment of this invention utilizes a first blade member having a first cutting element at one end and a second cutting element at an opposite end. The first blade member is pivotally connected to a second blade member which has a third cutting element at one end and a fourth cutting element at an opposite end. The first cutting element cooperates with the third cutting element to perform a cutting movement and the second cutting element cooperates with the fourth cutting element to perform a cutting movement. A pair of handle members are pivotally connected together with the first blade member and the second blade member being captured between the handle members. The handle members are movable between a first position and a second position. With the handle member in the first position, the first cutting element and the third cutting element extend outwardly from the handle members with the second cutting element and the fourth cutting element being located between the handle members and normally not in a position of usage. With the handle members in the second position, the second cutting element and the fourth cutting element extend outwardly from the handle members and are designed to perform a cutting operation with the first cutting element and the third cutting element being now located between the handle members and normally not in a position of usage.

A further embodiment of this invention is where the second basic embodiment includes locking devices to lock the handle members to the blade members when in the first position and in the second position.

A further embodiment of this invention is where the locking devices are actuated by actuators which are mounted at the outer free end of the handle members.

A further embodiment of this invention is where there is a separate cable for each handle member that extends between the locking device and the actuator with the locking device comprising a separate pivotally movable spring biased locking pin mounted on each handle member.

A further embodiment of this invention is where the just previous embodiment is modified by the actuator comprising a pivotally mounted lever with this lever being attached to the cable.

A further embodiment of this invention is where the just previous embodiment is modified by the lever having a bulbous free end with the bulbous free end functioning as an actuator facilitating manual pivoting of the lever and as a stop to keep the user's hands properly located on the handle members.

A further embodiment of the present invention is where the second basic embodiment is modified by the spring biased pin being confined within a spring housing and the locking pin being lineally movable between a locked position and an unlocked position.

A further embodiment of this invention is where the second basic embodiment is modified to include a protective guard to cover the second cutting element and fourth cutting element when located between the handle members.

A third basic embodiment of this invention is where a cutting tool comprises a first cutting blade mounted in a scissors arrangement with a second cutting blade with there being a cutting element located at each end of each cutting blade. A cutting element of the first cutting blade is to work with a cutting element of the second cutting blade to perform a cutting operation. A pair of handle members are pivotally connected together with the first cutting blade and the second cutting blade being captured therebetween. These handle members are flippable to opposite oriented positions with a pair of the cutting elements to operate together at each oriented position to perform a cutting operation on an exterior structure.

A further embodiment of this invention is where the third basic embodiment is modified to where one pair of the cutting elements comprises shears and the other pair of cutting elements comprises loppers.

A further embodiment of this invention is where the third basic embodiment is modified to include a locking arrangement to lock the handle members to the cutting blades in both of the oriented positions.

A further embodiment of this invention is where the locking arrangement of the third basic embodiment includes actuators which are mounted at the outer free ends of the handle members.

A further embodiment of this invention is where the actuators are connected to the locking devices by means of cables.

A further embodiment of this invention is where the third basic embodiment is modified by each actuator comprising a pivotally mounted lever with each lever being attached to a separate cable.

A further embodiment of this invention is where the just previous embodiment is modified by the lever being defined as having a bulbous free end with the bulbous free end functioning as an actuator facilitating manual pivoting of the lever and also as a stop to keep the user's hands properly located on the handle members.

A further embodiment of this invention is where the locking devices of the third basic embodiment comprises a pair of spring biased movable locking pins with there being a separate locking pin for each handle member.

A further embodiment of this invention is where each spring biased locking pin of the third basic embodiment is confined within a spring housing and the locking pin is lineally movable between a locked position and an unlocked position.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

Figures 1, 5:
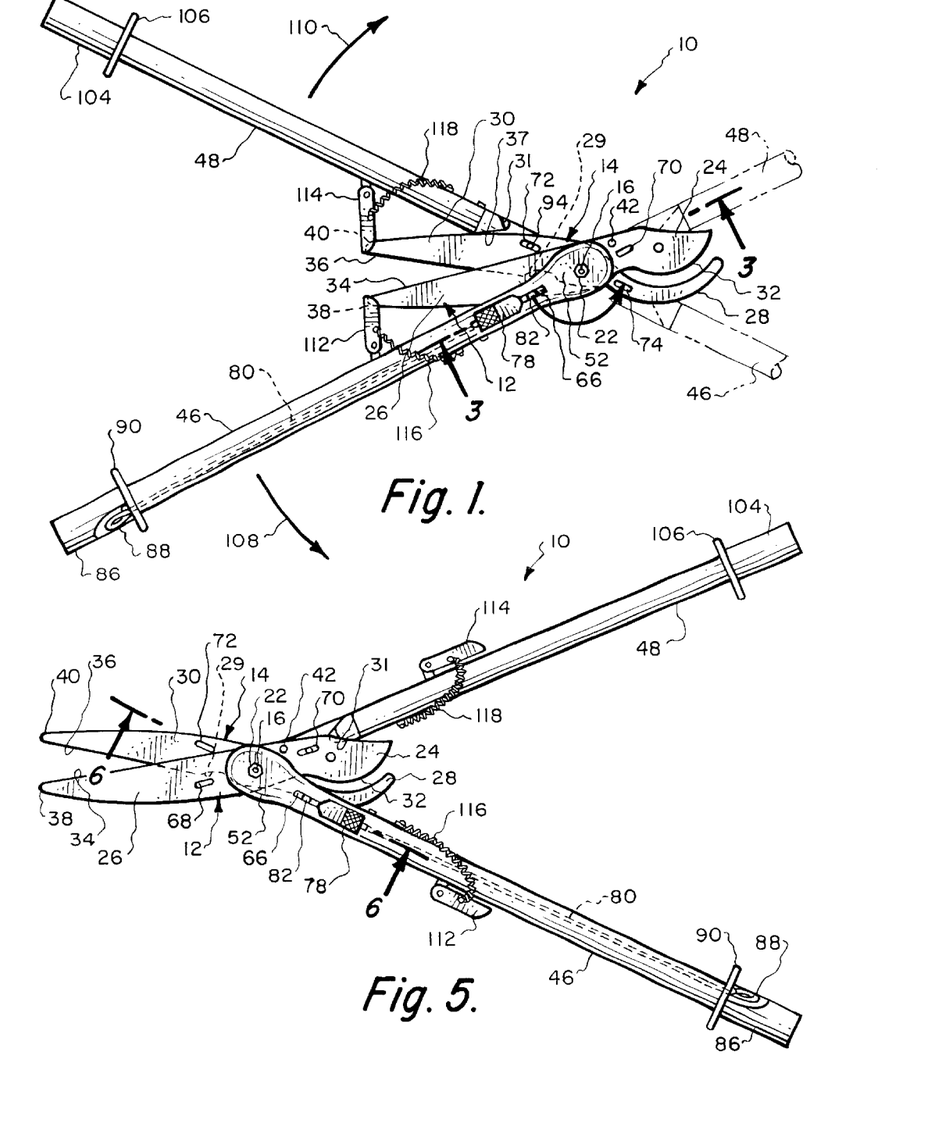
FIG. 1 is a side elevational view of the cutting tool of the present invention when in the position of using loppers as cutting elements where the cutting tool has a first embodiment of locking arrangement for the handle members.
FIG. 5 is a side elevational view of the cutting tool of FIG. 1 where the cutting elements that are at the position for usage comprise shears.
Figure 2:
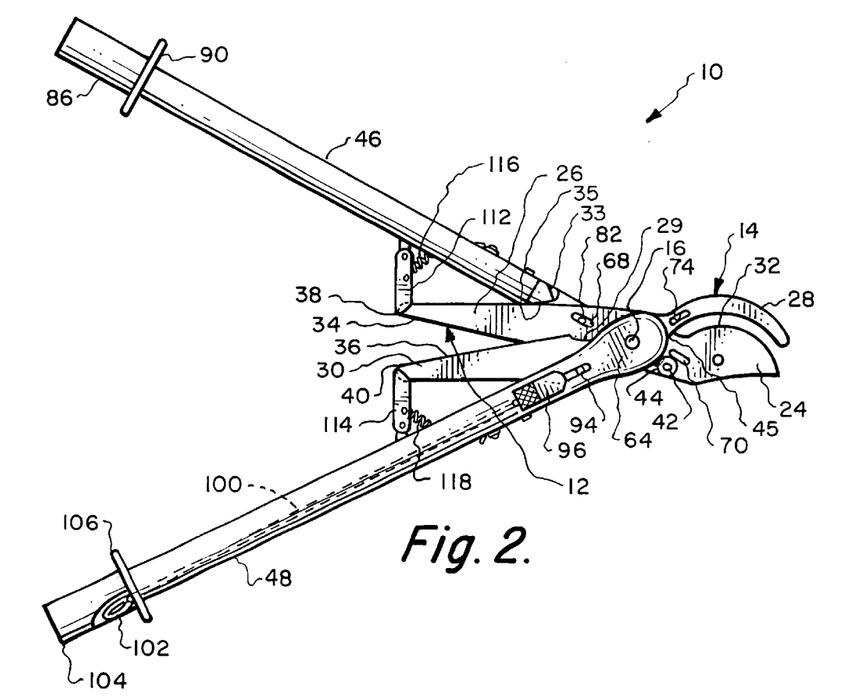
FIG. 2 is a reverse side elevational view of the cutting tool of the present invention of FIG. 1.
Figure 3:
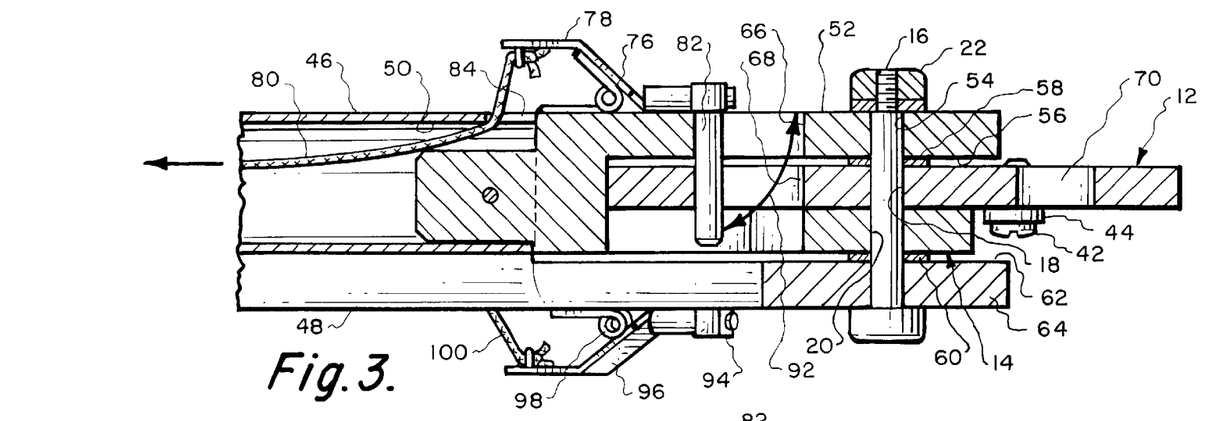
FIG. 3 is a cross-sectional view of the cutting tool of the present invention taken along line 3—3 of FIG. 1 showing the locking pin that connects between the handle member and a cutting blade in the locked position which is part of the first embodiment of locking arrangement.
Figure 4:
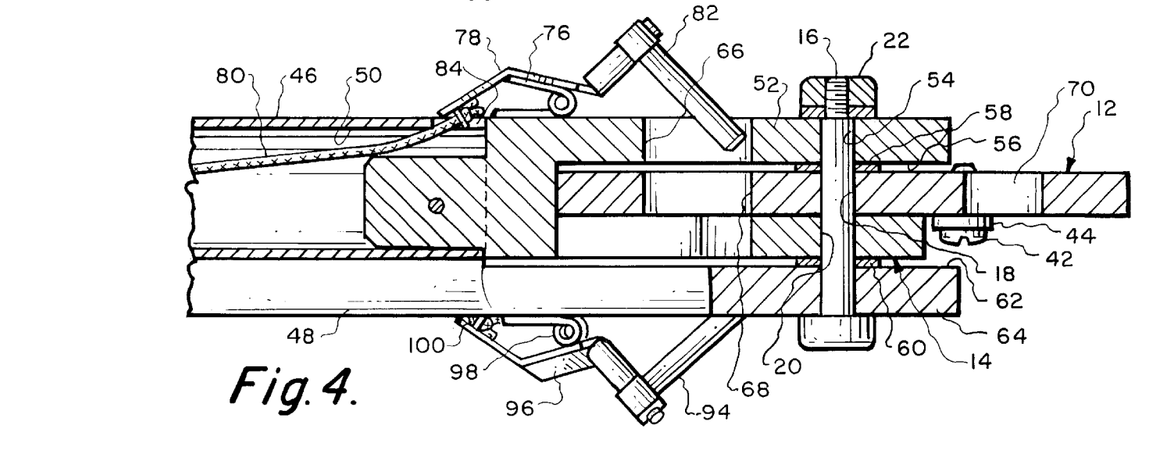
FIG. 4 is a cross-sectional view of the cutting tool of the present invention similar to FIG. 3 but showing the locking pin in the unlocked position.
Figure 6:
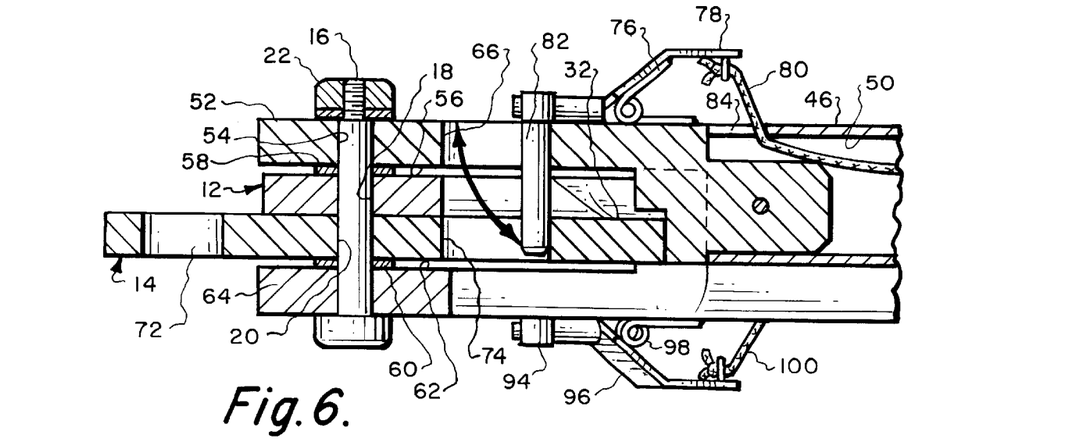
FIG. 6 is a cross-sectional view of the cutting tool of the present invention taken along line 6—6 of FIG. 5 showing the locking pin, which is part of the first embodiment of locking arrangement, in conjunction with a handle member and :a cutting blade being shown in the locked position.

Referring particularly to FIGS. 1, 2 and 5 of the drawings, there is shown the cutting tool 10 of this invention. The cutting tool 10 utilizes a cutting blade 12 and a cutting blade 14. Cutting blades 12 and 14 are pivotally connected together intermediate their ends at a pivot joint which is formed by a bolt 16 which passes through aligned holes 18 and 20 of their respective cutting blades 12 and 14 (FIG. 6). The bolt 16 is threadably connected to a nut 22 to secure the bolt 16 in position.

The cutting blade 12 has a lopper cutting element 24 formed at one end thereof. At the opposite end of the cutting blade 12 is a shear cutting element 26. The cutting blade 14 has formed at one end thereof a lopper cutting element 28, and at the opposite end thereof shear cutting element 30. The cutting blades 12 and 14 are to be pivotally movable about the bolt 16 so that the lopper cutting element 24, which includes sharp edge 32, is to slide alongside in a snug manner against cutting element 28. Actually, cutting element 28 doesn't perform a cutting operation with only the cutting operation occurring only by sharp edge 32. The lopper cutting elements 24 and 28 are intended to be used to cut through twigs and branches up to (and possibly greater) one inch in diameter. Whatever branch or twig that is captured between the cutting elements 24 and 28 will therefore be sheared by this relative movement. Included within cutting blade 14 is a cut-out 29. When using the shear cutting elements 26 and 30, and the user encounters a small diameter twig that is difficult to cut, the twig may be easily cut by the cut-out 29. In essence, the cut-out 29 functions as a mini-lopper.

When the shear cutting elements 26 and 30 are extended and intended to be used (FIG. 5), shoulder 31 of handle member 48 presses against lopper cutting element 24. When moving handle member 48 toward handle member 46. One half of the force encountered in cutting by elements 26 and 30 is transmitted directly from the shear cutting element 26 to handle member 48. At the same time, there is a shoulder 33 on handle member 46 that presses against lopper cutting element 28 so the cutting force is transmitted directly from shear cutting element 30 to handle member 46.

When the lopper cutting elements 24 and 28 are extended and intended to be used, shoulder 35 of handle member 46 presses against shear cutting element 26 when moving handle member 46 toward handle member 48. One half of the force encountered in cutting by elements 24 and 28 is transmitted directly from the lopper cutting element 24 to handle member 46. At the same time, there is a shoulder 37 on handle member 48 that presses against shear cutting element 30 so the cutting force is transmitted directly from lopper cutting element 28 to handle member 48.

The shear cutting element 26 includes a straight sharp edge 34 as opposed to the arcuate sharp edge 32 of the lopper cutting element 24. The shear cutting element 30 also includes a similar straight sharp edge 36. The sharp edges 34 and 36 cooperate together in a scissors like arrangement performing a cutting operation. The shear cutting elements 26 and 30 are designed to be utilized for cutting of vegetation, such as leaves and small twigs that are grown in conjunction with bushes and trees or other small plants. The shear cutting element 26 includes an outer end in the form of a tip 38. The shear cutting element 30 also includes a similar tip 40.

Mounted on the lopper cutting element 24 by means of a screw fastener 42 is a washer 44. The function of the washer 44 will be explained further on the specification.

There is a handle assembly which comprises an elongated tubular handle member 46 and another elongated tubular handle member 48. The handle members 46 and 48 are basically cylindrical in transverse cross-section. However, configurations could be utilized other than cylindrical. Referring particularly to FIG. 6, the handle member 46 is basically hollow forming an internal chamber 50. It is to be understood that a similar internal chamber (not shown) will be formed within the handle member 48. The handle member 46 is fixedly mounted to a head 52 at the inner end of the handle member 46. The head 52 includes a hole 54 which is to align with holes 18 and 20. The inner surface of the head 52 is formed into a planar surface 56. Located about the bolt 16 and located in between the planar surface 56 and the cutting blade 12 is a spacing washer 58. A similar spacing washer 60 is located between the cutting blade 14 and the planar surface 62 of a head 64 which is fixedly mounted at the inner end of the handle member 48.

FIGS. 1–6 include a first embodiment of locking arrangement which is defined as follows: Formed within the head 52 is an elongated hole 66. A similar elongated hole (not shown) is formed within the head 64. The cutting blade 12 also includes a pair of elongated holes 68 and 70 located in a spaced apart manner. The cutting blade 14 includes a similar pair of elongated holes 72 and 74. Fixedly mounted on the head 52 directly adjacent the elongated hole 68 is a coil spring 76. The coil spring 76 is also fixed to a lever 78. The outer end of the lever 78 is attached to a cable 80. Fixedly mounted on the inner end of the lever 78 is a locking pin 82. The locking pin 82 will be inserted and automatically located by the bias of the spring 76 within elongated holes 66 and 68 when the cutting tool is in the position shown in FIGS. 1 and 2. The cable 80 passes through a hole 84 to be located within the internal chamber 50 of the handle member 46. The cable 80 will then be conducted through another hole (not shown) formed in the handle member 46 and to then be located exteriorly to be exteriorly exposed within elastomeric grip member 86 which is mounted about the outer end of the handle member 46. The cable 80 terminates at a ring 88 which is mounted directly adjacent the grip member 86. The grip member 86 includes an annular flange 90 which tends to keep the user's hands confined to the grip member 86.

When the user manually grasps the ring 88 and exerts a pulling force thereon, the cable 80 is moved which will cause the lever 78 to be pivoted against the bias of the spring 76. This will cause the locking pin 82 to be moved in the direction of arrow 92 from the locking position shown in FIG. 3 to an unlocking position, shown in FIG. 4. In its unlocking position shown in FIG. 4, the locking pin 82 is disengaged from the elongated hole 68. This will now permit the handle member 46 to be pivoted about one hundred forty degrees from the position shown in FIG. 1 to the position shown in FIG. 5. In that position, upon release of the ring 88, the locking pin 82 will then be automatically pivoted again in the direction of arrow 92 which will result in the locking pin 82 engaging with elongated hole 70. The handle member 46 is now locked relative to the cutting blade 12 with the shear cutting element 26 protruding outward and the lopper cutting element 24 being located between the handle members 46 and 48.

In a similar manner, there is a locking pin 94 which is fixedly mounted on a lever 96. The lever 96 is mounted onto a coil spring 98 which is fixedly mounted onto the head 64. The outer end of the lever 96 is attached to a cable 100 which is to be conducted through a hole (not shown) and passed within the internal chamber of the handle member 48. The outer end of the cable 100 connects to a ring 102 which is located exteriorly of the grip member 104. The grip member 104 also includes a similar annular flange 106 which is essentially identical to annular flange 90. Grasping of the ring 102 by the user will cause the cable 100 to be moved and pivoting of the lever 96 which will cause the locking pin 94 to be removed from elongated slot 72 which will permit the elongated handle 48 to be pivoted from the position shown in FIG. 1 to the position shown in FIG. 5. Thereby upon release of the ring 102, the lever 96 will be pivoted due to the action of the bias of spring 98 with the locking pin 94 then falling within the elongated hole 74 thereby locking the handle 48 to the cutting blade 12.

It is to be noted that in referring to FIGS. 1–6 that the cutting blades 12 and 14 are shown in the slightly open position and not in the completely closed or cutting position. It can thus be seen that when the handle members 46 and 48 are in the juxtaposed position shown in FIGS. 1 and 2 that the cutting elements 24 and 28 are intended to be used in order to cut whatever exterior structure is desired. Now let it be assumed that the user wishes to instead of using cutting elements 24 and 28 to use cutting elements 26 and 30. The user only needs to grasp the rings 88 and 102 simultaneously which will cause release of the respective locking pins 82 and 94 which will permit the handle members 46 and 48 to be pivoted in the direction of their respective arrows 108 and 110 of FIG. 1. When the handles 46 and 48 have been pivoted one hundred forty degrees, their respective locking pins 82 and 94 (with rings 88 and 102 released) will again be moved to a locking position and the cutting tool 10 will be in the position as shown in FIG. 5. In this position, the cutting elements 26 and 30 can then be used in a manner resembling a conventional pruning shears. The washer 44 functions as a stop to define the maximum cutting position. When surface 45 contacts washer 44, this maximum cutting position is defined. No further movement of handles 46 and 48 toward each other is possible.

Because the tips 38 and 40 of the cutting elements 26 and 30 respectively constitute rather sharp points and are going to be located somewhat near the grip members 86 and 104, when the cutting elements 26 and 30 are located in between the handles 46 and 48, as shown in FIGS. 1 and 2, it is desirable to prevent injury to the user to provide some form of protection covering the tips 38 and 40. For this purpose, a channel member 112 is pivotally mounted onto the handle member 46. A similar channel member 114 is pivotally mounted onto the handle member 48. The channel member 112 is connected by a coil spring 116 to the handle member 46. A similar coil spring 118 connects the channel member 114 to its respective handle member 48. The coil springs 116 and 118 exert a continuous bias on their respective channel members 112 and 114 tending to locate such in an outwardly extending position, as is shown in FIGS. 1 and 2 of the drawings. In this position, the channel member 112 will cover the tip 38 of the cutting element 26 and the channel member 114 will cover the tip 40 of the cutting element 30. The channel members 112 and 114 will remain in position covering the tips 38 and 40 respectively during the entire time that the handle members 46 and 48 are moved back and forth relative to each other performing of the cutting operation. When the cutting tool 10 is in the position shown in FIG. 5, the channel members 112 and 114 can be manually pivoted to a stowage position which is alongside their respective handle members 46 and 48, as is clearly shown in FIG. 5. It is to be understood that when the handle members 46 and 48 are again moved to the position shown in FIGS. 1 and 2 that the channel members 112 and 114 are to be manually moved to the extended position which will be maintained in that extended position by their respective coil springs 116 and 118.

Referring particularly to FIGS. 7–11 of the drawings, there is shown a second embodiment of locking arrangement included within the cutting tool 120 of this invention. Similar numbers have been utilized to refer to similar parts as was used in conjunction with the cutting tool 10 of this invention. For an explanation of these parts, reference is to be had to cutting tool 10.

The cutting tool 120 has a disc 122 mounted by means of a bolt 126 on the lopper cutting element 24. The disc 122 functions to define the limit of closing movement between the lopper cutting elements 24 and 28 with the disc 122 coming into contact with the lopper cutting element 28 which prevents further closing movement between the cutting elements 24 and 28.

The handle member 46 has mounted on its outer free end a resilient grip 126. Handle member 48 has mounted on its outer free end a resilient grip 128. The resilient grips 126 and 128 are to provide for cushioning comfortable grip with the hands of the user.

Mounted on the head 64 is a spring housing 130. It is to be understood that there is a similar spring housing 132 mounted on the head 52. Each spring housing 130 and 132 is basically a cylindrical cap which includes an internal cylindrical chamber 134. However, it is considered to be within the scope of this invention that the caps 130 and 132 could be other than cylindrical and the internal cylindrical chamber 134 could be other than cylindrical such as, for example, octagonal, or even triangular. The spring housing 130 has an open end which is located at externally threaded section 136. The threads 136 are to threadingly engage with internally threaded section 138 which is formed within the head 64. Thus the spring housing 130 is capable of being disengaged from the head 64 to provide access to within the internal cylindrical chamber 134. This access may be necessary to repair or replace coil spring 140 which is mounted within the internal cylindrical chamber 134. The closed end of the spring housing 130 includes a hole 142. The function of the hole 142 is to permit passage therethrough of one end of a cable 144 which is then fixedly mounted to a locking pin 146. The inner end of the locking pin 146 has a sleeve 148. The coil spring 140 surrounds the sleeve 148. Therefore, the sleeve 148 functions as a guide for the coil spring 140. One end of the coil spring 140 abuts against the locking pin 146 and the opposite end of the coil spring 140 abuts against the closed end of the spring housing 130.

Fixedly mounted on the exterior surface of the closed end of the spring housing 130 is a guide block 150. A similar guide block 152 is fixedly mounted on the closed end of the spring housing 132. In each of the guide blocks 150 and 152 there is located a slot, such as slot 154, formed within the guide block 150. It is the function of the slot 154 to locate and position the cable 144 relative to the guide block 150 as the cable 144 is conducted over the guide block 150. The cable 144 slides within slot 154. To make this sliding easier, the slot 154 could be coated with a slippery substance, such as the product known by the trademark "Teflon".

The cable 144 passes beneath a rod 156 which is fixedly mounted on bracket 158 which is fixedly mounted onto the head 64. It is to be understood that in conjunction with the guide block 152 there will be a cable 160 which is conducted through a slot formed within the guide block 152 with it also passing beneath a rod 162 of a bracket 164. The bracket 164 will be fixedly mounted onto the head 52. The cable 144 is then conducted through hole 84 formed within the handle member 48. The cable 144 is then conducted through hole 166 in chamber 168 formed within the head 64. The chamber 168 connects with internal chamber 50.

Fixedly mounted within the interior of the handle member 48 are a pair of guide rods 170 and 172. The cable 144 is conducted around each of the guide rods 170 and 172 and out through hole 174 formed within the handle member 48. The outer end of the cable 144 is then fixedly connected to lever 176. In a similar manner, the cable 160 is conducted through an internal chamber formed within the handle member 46 and then is conducted exteriorly of the internal chamber and is fixedly secured to a lever 178. Lever 176 is pivotally mounted on a rod 180 which is fixedly mounted on a bracket 182. The bracket 182 is fixed to the handle member 48. In a similar manner, the lever 178 is to be pivotally mounted to a rod, which is not shown, and then fixed by a bracket, not shown, to the handle member 46. It is to be noted that in referring to FIG. 8 that the levers 176 and 178 are located on the same side of the cutting tool 120 as opposed to being on opposite sides thereof. This is to facilitate manual connection by the user's thumbs in conjunction with the levers 176 and 178. The user's thumb is to be pressable downward in the direction of arrow 184 on bulbous end 186 of the lever 176. In a similar manner, the user's thumb is to be able to be pressed down against bulbous end 188 of the lever 178.

Figures 7, 8, 11:
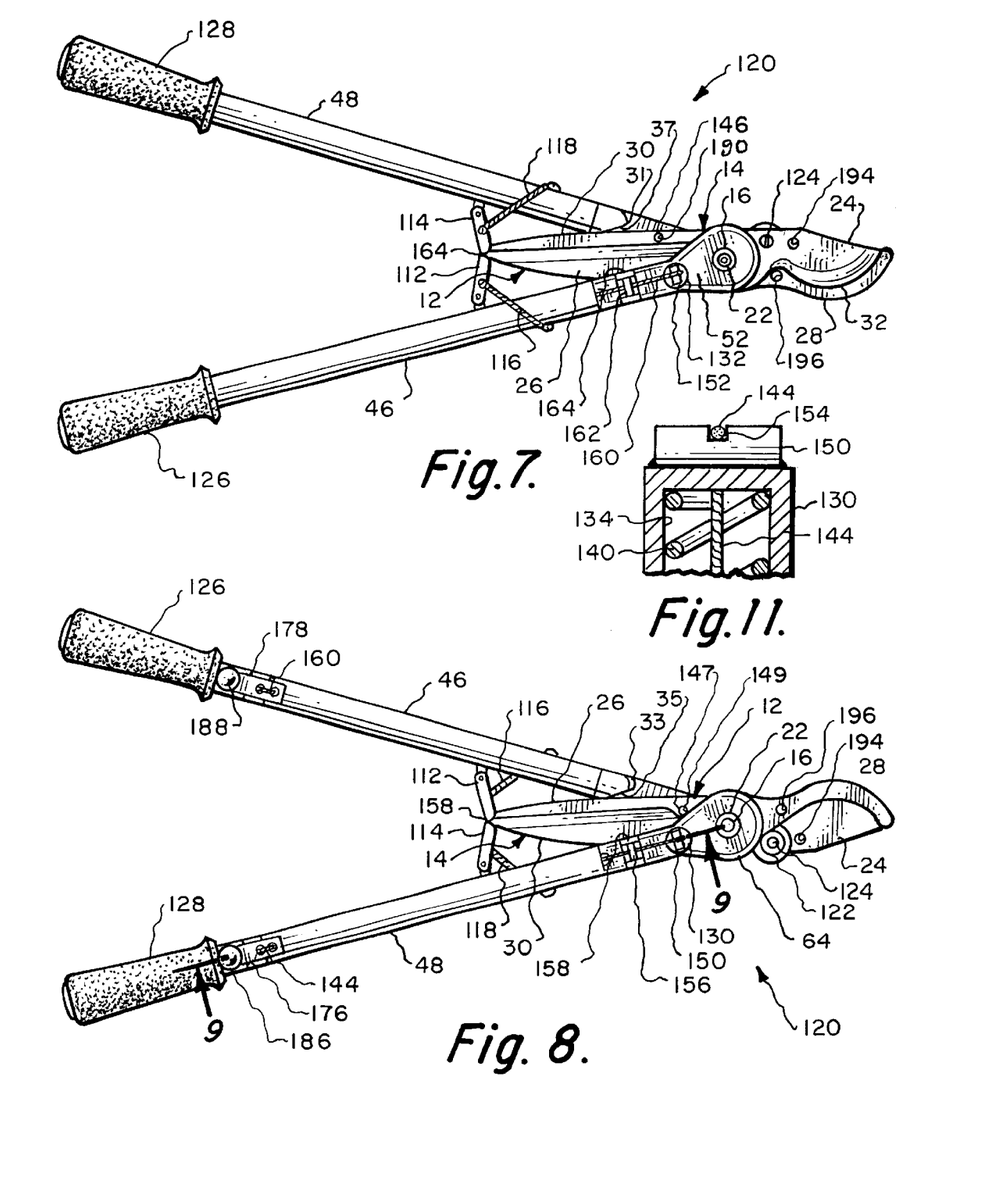
FIG. 7 is a side elevational view similar to FIG. 1 but where the cutting tool is shown in a closed position and also which includes a second embodiment of locking arrangement for the handle members.
FIG. 8 is a reverse side elevational view of the cutting tool of FIG. 7.
FIG. 11 is a cross-sectional view taken along line 11—11 of FIG. 9.

Pressing down in the direction of 184 on bulbous end 186 will cause the lever 176 to pivot on the rod 180. This causes the cable 144 to be pulled which will result in the locking pin 146 to be disengaged from hole 190 of the lopper cutting element 28 with the locking pin 146 now being located within hole 192 located within the head 64. Similar disengagement of locking pin 147 that is located within the spring housing 132 is to occur by pressing down on bulbous end 188. Pin 147 is engaged with a hole 149 of shear cutting element 26. It is to be understood that pressing down on bulbous ends 186 and 188 is to occur simultaneously at which time the handle members 46 and 48 can be pivoted about one hundred forty degrees which will locate the shear cutting elements 26 and 30 in the extended position and the lopper cutting elements 24 and 28 in the storage position located between the handle members 46 and 48 with locking pin 146 engaging with hole 196 and locking pin 147 engaging with hole 194. With the shear cutting elements 26 and 30 in the extended position, such can be used to affect a cutting operation on an exterior structure. When the lopper cutting elements 24 and 28 are in the extended position as shown in FIGS. 7 and 8, such can be used to affect a cutting operation on an exterior structure, which is not shown.

Figure 9:
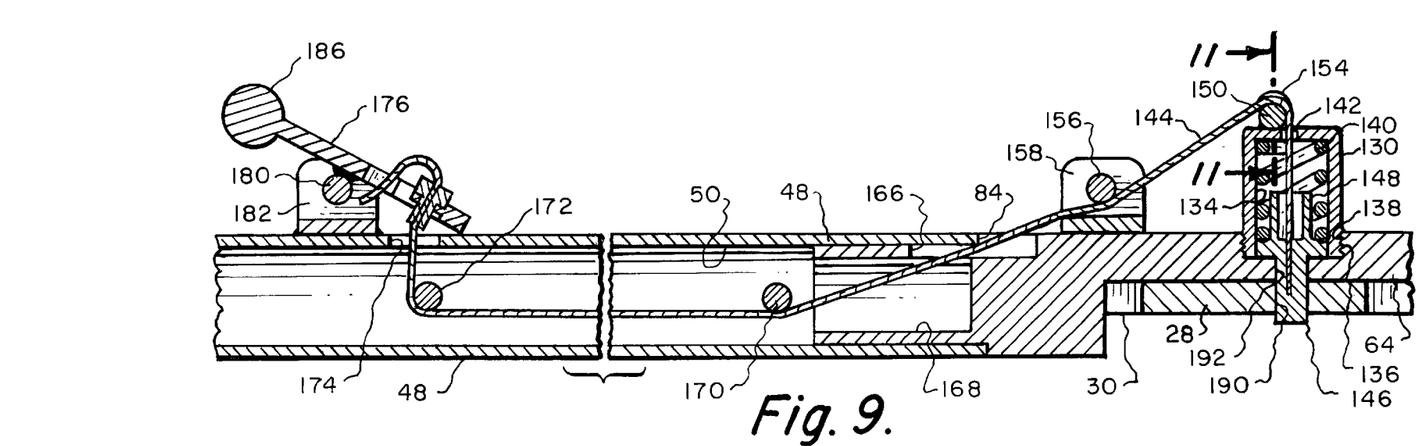
FIG. 9 is a cross-sectional view taken along line 9—9 of FIG. 8 showing more clearly the second embodiment of locking arrangement for the handle members with this locking arrangement being shown in the locked position.
Figure 10:
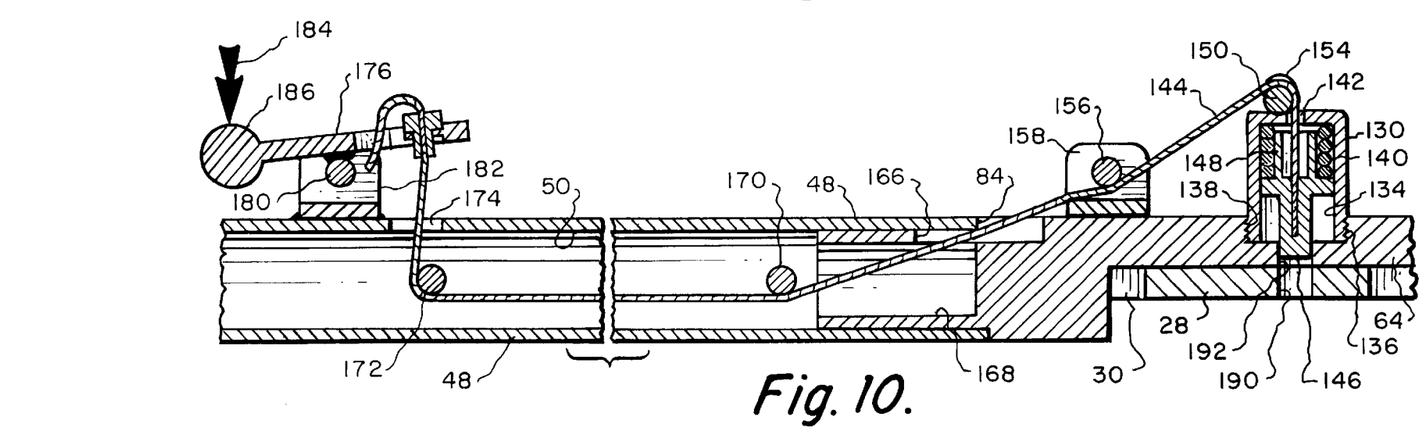
FIG. 10 is a view similar to FIG. 9 but showing the locking arrangement in the unlocked position.

As long as the levers 176 and 178 are pivoted by pressing down respectively on their bulbous members 186 and 188, the handle members 46 and 48 can be freely pivoted relative to the cutting blades 12 and 14. However, once the manual force applied to the bulbous ends 186 and 188 is released, the spring force that is provided by coil spring 130 and the other coil spring, which is not shown, located within the spring housing 132, the levers 176 and 178 will again be pivoted to the lower position, such as shown in FIG. 9 of the drawings, and the locking pins, such as locking pin 146, will then connect with holes 194 and 196 of the lopper cutting elements 24 and 28. The shear cutting elements 26 and 30 are then capable of being used to affect a cutting operation. By having the cutting blades 12 and 14 being locked to the handles 46 and 48 during the time of usage of any of the cutting elements, there will be eliminated any problem with the blades being jammed which could be caused by resin or debris from cutting of tree branches or other vegetation.

The cables 144 and 160 can be replaced by disengaging such from their respective levers 176 and 178 and by unscrewing of their respective spring housings 130 and 132 and then disengaging of the cables from their respective locking pins, such as locking pin 146.

What is claimed is:

1. A cutting tool comprising:
   a first set of cutting blades;
   a second set of cutting blades, said first set being connected to said second set;
   a handle assembly connected to said first set and said second set, said handle assembly comprising a pair of handle members, said handle members being pivotable between a first position and a second position, said handle members being in juxtaposition when in both said first position and said second position but said handle members are to be moved approximately one hundred forty degrees between said first position and said second position, whereby said handle members are to be moved toward each other when in said first position to cause said first set of cutting blades to cut, whereby said handle members are to be moved toward each other when in said second position to cause said second set of cutting blades to cut;
   means for locking said handle members to said first set of cutting blades and said second set of cutting blades so as to fix said handle members relative to said first set of cutting blades and said second set of cutting blades when in said first position and when in said second position, said means for locking being disengageable in order to permit movement of said handle members between said first position and said second position; and
   means for actuating said means for locking being mounted on said handle members, each handle member of said handle members having an outer free end, said means for actuating being located at said outer free end.

2. The cutting tool as defined in claim 1 wherein:
   a cable located in conjunction with each said handle member with there being a separate said cable for each said handle member, each said cable to interconnect between said means for actuating and said means for locking.

3. The cutting tool as defined in claim 2 wherein:
   said means for locking comprising a spring biased locking pin mounted on each said handle member, there being a separate said spring biased locking pin for each said handle member.

4. The cutting tool as defined in claim 3 wherein:
   said spring biased locking pin being mounted within a spring housing, said locking pin being lineally movable between a locked position and an unlocked position.

5. The cutting tool as defined in claim 2 wherein:
   said means for actuating comprising a pivotally mounted lever, said lever being attached to said cable.

6. The cutting tool as defined in claim 5 wherein:
   said lever having a bulbous free end, said bulbous free end functioning as an actuator facilitating manual pivoting of said lever and as a stop to keep the user's hands properly located on said handle members.

7. The cutting tool as defined in claim 5 wherein:
   said first set of cutting blades comprising loppers, said second set of utility blades comprising shears, a mini-lopper formed within said shears for cutting small twigs when using said shears.

8. A cutting tool comprising:
   a first cutting blade having a first cutting element at one end and a second cutting element at an opposite end;
   a second cutting blade having a third cutting element at one end and a fourth cutting element at an opposite end;
   said first cutting blade being pivotally connected to said second cutting blade at a pivot joint located intermediate said one end and said opposite end of both said first cutting blade and said second cutting blade, said first cutting element being movable toward said third cutting element to perform a cutting movement and said second cutting element being movable toward said fourth cutting element to perform a cutting movement;
   a pair of handle members each having an inner end which are pivotally connected together with said first cutting blade and said second cutting blade being captured between said handle members, each said handle member having an outer free end, said handle members being movable between a first position and a second position, with said handle members in said first position said first cutting element extends outward from said handle members and is movable in a cutting operation with said third cutting element which also extends outward from said handle members and said second cutting element and said fourth cutting element are located between said handle members, with said handle members in said second position said second cutting element extends outward from said handle members and is movable in a cutting operation with said fourth cutting element which also extends outward from said handle members and said first cutting element and said third cutting element are located between said handle members;

means for locking said handle members to said first cutting blade and said second cutting blade, said means for locking being activated in both said first position and said second position with it being necessary for said means for locking to be deactivated in order to permit movement of said handle members between said first position and said second position; and said means for locking being connected to a means for actuating, said means for actuating to be manually moved by a user to cause movement of said means for locking from a locked position to an unlocked position, said means for actuating being mounted at said outer free end of each said handle member.

9. The cutting tool as defined in claim 8 wherein:

each said handle member including a cable which connects between each said means for actuating and said means for locking, said means for locking comprises a spring biased locking pin, there being a said locking pin mounted on each said handle member with there being a separate said cable for each said handle member.

10. The cutting tool as defined in claim 9 wherein:

said means for actuating comprising a pivotally mounted lever, said lever being attached to said cable.

11. The cutting tool as defined in claim 10 wherein:

said lever having a bulbous free end, said bulbous free end functioning as an actuator facilitating manual pivoting of said lever and as a stop to keep the user's hands properly located on said handle members.

12. The cutting tool as defined in claim 9 wherein:

said spring biased locking pin being mounted within a spring housing, said locking pin being lineally movable between a locked position and an unlocked position.

13. A cutting tool comprising:

a first cutting blade having a first cutting element at one end and a second cutting element at an opposite end;

a second cutting blade having a third cutting element at one end and a fourth cutting element at an opposite end;

said first cutting blade being pivotally connected to said second cutting blade at a pivot joint located intermediate said one end and said opposite end of both said first cutting blade and said second cutting blade, said first cutting element being movable toward said third cutting element to perform a cutting movement and said second cutting element being movable toward said fourth cutting element to perform a cutting movement;

a pair of handle members each having an inner end which are pivotally connected together with said first cutting blade and said second cutting blade being captured between said handle members, each said handle member having an outer free end, said handle members being movable between a first position and a second position, with said handle members in said first position said first cutting element extends outward from said handle members and is movable in a cutting operation with said third cutting element which also extends outward from said handle members and said second cutting element and said fourth cutting element are located between said handle members, with said handle members in said second position said second cutting element extends outward from said handle members and is movable in a cutting operation with said fourth cutting element which also extends outward from said handle members and said first cutting element and said third cutting element are located between said handle members; and said second cutting element and said fourth cutting element both having sharp tips, a protective guard to cover said sharp tips when said cutting tool is in said first position, said protective guard comprises a pair of channel members each of which is pivotally mounted on a said handle member.

14. A cutting tool comprising:

a first cutting blade having a first cutting element at one end and a second cutting element at an opposite end;

a second cutting blade having a third cutting element at one end and a fourth cutting element at an opposite end;

said first cutting blade being pivotally connected to said second cutting blade at a pivot joint located intermediate said one end and said opposite end of both said first cutting blade and said second cutting blade, said first cutting element being movable toward said third cutting element to perform a cutting movement and said second cutting element being movable toward said fourth cutting element to perform a cutting movement;

a pair of handle members each having an inner end which are pivotally connected together with said first cutting blade and said second cutting blade being captured between said handle members, each said handle member having an outer free end, said handle members being movable between a first position and a second position, with said handle members in said first position said first cutting element extends outward from said handle members and is movable in a cutting operation with said third cutting element which also extends outward from said handle members and said second cutting element and said fourth cutting element are located between said handle members, with said handle members in said second position said second cutting element extends outward from said handle members and is movable in a cutting operation with said fourth cutting element which also extends outward from said handle members and said first cutting element and said third cutting element are located between said handle members; and said first cutting element and said third cutting element comprising loppers, said second cutting element and said fourth cutting element comprising shears, said fourth cutting element including a cut-out which is to function as a mini-lopper with said second cutting element.

15. A cutting tool comprising:

a first cutting blade being mounted in a scissors arrangement with a second cutting blade, there being a cutting element located at each end of said first cutting blade and said second cutting blade with a said cutting element of said first cutting blade to work with a said cutting element of said second cutting blade to perform a cutting operation;

a pair of handle members each having an inner end which are pivotally connected together with said first cutting blade and said second cutting blade being captured between said handle members, said handle members being flippable to opposite oriented positions with a pair of said cutting elements to operate together at each oriented position to perform a cutting operation on a said exterior structure;

means for locking said handle members to said first cutting blade and said second cutting blade at each said oriented position, said means for locking being movable to a disengaged position permitting movement of said handle members between said oriented positions; and said means for locking being connected to a means for actuating, said means for actuating being manually movable by a user in order to affect movement of said means for locking, said handle members having outer free ends, said means for actuating being located at said outer free ends.

16. The cutting tool as defined in claim 15 wherein:

said means for actuating being connected to said means for locking by means of a cable with there being a separate said cable for each said handle member, each said cable being mounted in conjunction with each said handle member.

17. The cutting tool as defined in claim 16 wherein:

said means for actuating comprising a pivotally mounted lever, said lever being attached to said cable.

18. The cutting tool as defined in claim 17 wherein:

said lever having a bulbous free end, said bulbous free end functioning as an actuator facilitating manual pivoting of said lever and as a stop to keep the user's hands properly located on said handle members.

19. A cutting tool comprising:

a first cutting blade being mounted in a scissors arrangement with a second cutting blade, there being a cutting element located at each end of said first cutting blade and said second cutting blade with a said cutting element of said first cutting blade to work with a said cutting element of said second cutting blade to perform a cutting operation;

a pair of handle members each having an inner end which are pivotally connected together with said first cutting blade and said second cutting blade being captured between said handle members, said handle members being flippable to opposite oriented positions with a pair of said cutting elements to operate together at each oriented position to perform a cutting operation on a said exterior structure;

means for locking said handle members to said first cutting blade and said second cutting blade at each said oriented position, said means for locking being movable to a disengaged position permitting movement of said handle members between said oriented positions; and said means for locking comprising a spring biased movable locking pin with there being a separate said locking pin for each said handle member.

20. The cutting tool as defined in claim 19 wherein:

said spring biased movable locking pin being combined with a spring housing, said locking pin being lineally movable between a locked position and an unlocked position.

* * * * *